United States Patent [19]

Dahlberg

[11] 4,108,344
[45] Aug. 22, 1978

[54] METHOD FOR CONTINUOUS WEIGHING OF A CONTINUOUS BANDFORMED OR MATFORMED MATERIAL, AND AN ARRANGEMENT FOR EXECUTION OF THE METHOD

[75] Inventor: Stellan Dahlberg, Tidan, Sweden

[73] Assignee: Rockwool Aktiebolaget, Skovde, Sweden

[21] Appl. No.: 777,857

[22] Filed: Mar. 15, 1977

[30] Foreign Application Priority Data

Jun. 6, 1976 [SE] Sweden .............................. 76063817

[51] Int. Cl.² .................... B65H 23/22; B65G 69/00; G01G 11/14; G01G 13/04
[52] U.S. Cl. ........................................ 226/1; 226/42; 198/505; 177/16; 177/121
[58] Field of Search ................ 177/16, 50, 145, 121; 198/505; 226/1, 42

[56] References Cited

U.S. PATENT DOCUMENTS

| 2,822,024 | 2/1958 | Himmelheber et al. | 177/16 UX |
| 3,890,547 | 6/1975 | Keck | 226/42 X |

Primary Examiner—George H. Miller, Jr.
Attorney, Agent, or Firm—Larson, Taylor and Hinds

[57] ABSTRACT

A continuously running, band-formed or mat-formed material, such as mineral wool, is weighed continuously at a given point, and the sensed weight is used to control the speed of a conveyor arrangement along which the band of material is running. The material is supported and transported along a first driven conveyor and onto a second driven conveyor spaced a short distance from the discharge end of the first conveyor. The first and second conveyors are oriented to form an upwardly concave obtuse angle such that the band of material deforms and bends through an upwardly concave obtuse angle as it passes from the first conveyor to the second conveyor. The band of material is continuously weighed as it passes between the first and second conveyors by passing the deformed and bent band onto and along a third non-driven idler conveyor located between the first and second conveyors and arranged to continuously sense the weight of the band passing therealong. The first and second conveyors are driven at equal speeds, but the speeds are varied in response to weight changes sensed by the third conveyor means. The third conveyor means may be in the form of a roller mounted in the space between the first and second conveyors.

13 Claims, 2 Drawing Figures

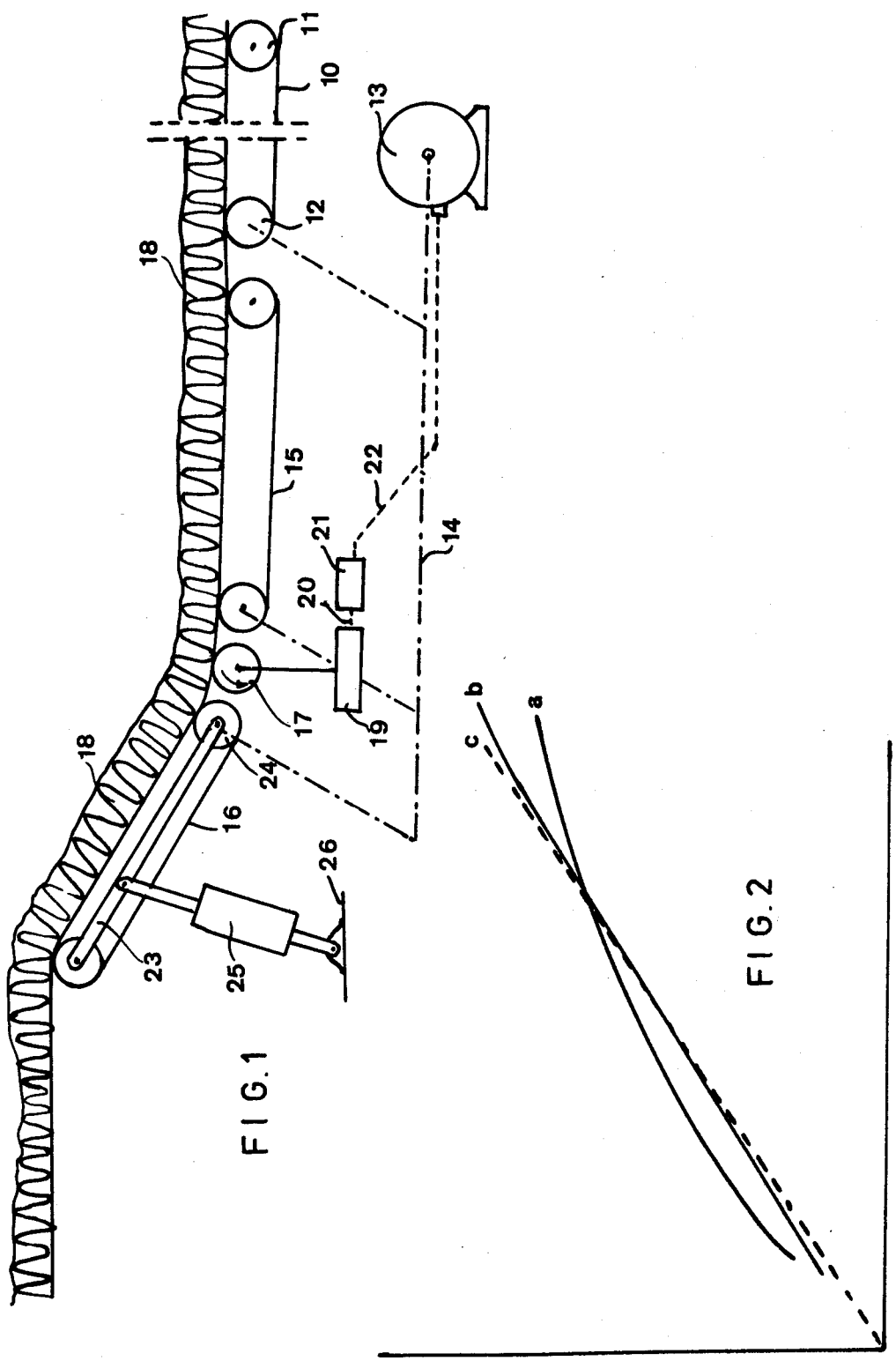

METHOD FOR CONTINUOUS WEIGHING OF A CONTINUOUS BANDFORMED OR MATFORMED MATERIAL, AND AN ARRANGEMENT FOR EXECUTION OF THE METHOD

The present invention refers firstly to a method for continuous weighing of a continuously running, bandformed or matformed material. The invention thereby in first place refers to such weighing in connection with the product of mineral wool. Secondly, the invention also refers to an arrangement for execution of said method.

Nowadays mineral wool is produced practically exclusively by so called spinning of a melt of the mineral material forming the basis of the production, which usually is slag, glass, stone or different stone mixtures, frequently along with certain additions such as lime, and with possible addition to the spun mineral wool of dust binding means and fibre binding means. The spinning aggregates thereby also practically exclusively work according to the centrifugal principle, the mineral melt being poured down onto one or more rapidly rotating means, together forming what one calls a "spinning aggregate", from which the melt is thrown out in the form of thin fibres, which are deposited on a continuously movable collection band, acting as transportation means, where they form a "mat". This mat, perhaps, may also be subjected to certain compression, and dependent upon the strength of said compression the mat will be tight to a different degree and consequently also obtain a correspondingdegree of different volume weight.

Of course, it is of the greatest importance for a high class product that the weight per unit of surface, below called the "surface weight," is constant along all of the length of the mat.

However, experienced has proved that it is very difficult to maintain a constant volume weight and as a consequence thereof also constant surface weight in the longitudinal direction of the mat. Dependent upon the feed to the oven, in which the mineral melt is prepared, it may get different viscosity in connection with different melting speed and melting temperature or over-temperature above the melting temperature. A thinner fluid mineral melt thereby is usually poured out in a greater amount than a thicker fluid melt. The pressure existing in the oven above the existing material in molten form may also vary and influence the pouring out speed.

It must be regarded as less realistic to try, in a satisfactory way to influence the procedure in the oven for causing a constant volume weight or surface weight on the produced mineral wool mat, amongst others due to the lag in the control, which is an unavoidable consequence of the great heat capacity of the material existing in the oven. Therefore, in practice, one has been advised to compensate for an increased feed of mineral melt by increasing the speed of movement of the transportation means or the collection band or for a decreased feed of mineral melt by decreasing the speed of movement of the transportation means or the collection band, respectively. One has also tried to find solutions for the controlling problem existing thereby. One such solution comprised measuring the power, consumed for driving a spinning aggregate or in exceptional cases for driving the transportation means or the collection band, a greater amount of mineral fibre forming mass or mineral fibres, respectively, requiring a greater power and vice versa. By means of a variable dependent upon the power one would thereafter be in a state of controlling the speed of the transportation means or the collection band, respectively, so that constant or at least approximately constant surface weight would be obtained.

However this method has not proved to be good in practice, in the first place because of its sensitivity not being sufficient for obtaining a fine control.

The present invention therefore refers to a method for controlling the speed of movement of the transportation means or the collection band respectively, deviating from the above one, dependent upon a locally deposited amount of mineral wool in a given place on the transporation means or the collection band, respectively. Such a method, however, requires a weighing arrangement, by which one may be sufficient accuracy measure the mat weight above the measuring place in every specific moment. Due to amongst others the stiffness of the collection band traditional band balances which are known per se cannot without further adaption be used.

Extensive tests forming basis of the present invention, however, have proved that these difficulties may be overcome by leading the transport means or the collection band, respectively, in a path, which in one or a plurality of places is re-directed regarding its angle to the horizontal level to a deviating direction, and that the weighing takes place in a place, where the transport means, carrying the mineral wool mat, forms an upwardly directed, obtuse angle with the horizontal level, and that the weighing device is applied just below this part of the transport means.

The weight, read in the weighing device, can either be used directly or it may be recalculated in one way or another, for instance by deduction of the influence of the weight of the transport means, so that one will get the net weight of the mineral wool mat, and the output signal from the weighing arrangement or the recalculation device, respectively, may thereafter be used for controlling the speed of movement of the transport means or the collection band, respectively. The weight statement signal thereby is transferred to a transmitter, which in turn influences an arrangement for controlling the speed of the transport means or the collection band, respectively, so that an equalization of differences otherwise occuring in the volume weight or the surface weight of the collected mineral wool is obtained.

This invention has been created in an empirical way, and one is not quite clear about the explanation if its method of action, but in practical tests, the result of which will be further reported below, it has nevertheless been proved that an exceedingly exact weight statement and as a consequence thereof an exceedingly good control of the volume weight and surface weight of the mineral wool mat may be obtained in this way. Part of the explanation may be that the mineral wool on the collection band is comprehensive, whereby the specific place, where the weighing takes place, comprises mineral wool, the weight of which does not only act by its value proper but also will cooperate with forces, transferred by means of the bond with adjacent parts of the mineral wool mat before or after the weighing place. In this way, certainly, it is explained that usual band balances, acting evenly will not give the desired accuracy, but one will nevertheless not thereby obtain the satisfactory explanation, why the weighing device according to the present invention will give such an apparently much more exact result. Band weighing devices hitherto known as a matter of fact have practically exclusively been used for weighing loosely stored material, for instance piece formed or grain formed or powder formed material, where there scarcely will be any such bond forces. The bond forces however cannot be mathematically and technically analyzed, and this probably is the main reason that one could not even when using very complicated calculation machines provide a satisfactory result with traditional band weighing devices working in an even path.

Thus, the invention refers to a method for continuous weighing of a continuous comprehensive material, existing in band form or mat form, and transported on a transport path or one or more conveyors, fully or in part replacing said transport path or forming a compliment thereof. Below the transported material, preferably level with the most downwardly situated parts of the transport path or the conveyors, thereby a short conveyor is applied in connection with a weight recording means, said short conveyor receiving the weight of the transport path along with the weight of any band or mat formed material placed thereon.

According to the invention, the transport path or the short conveyor is adjusted in such a way that the band or mat formed, comprehensive material resting thereon will, in place of the short conveyor form an obtuse, upwardly concave angle.

The short conveyor, which is in connection with the weight recording means, thereby preferably comprises a roller.

With continuous weighing in the above mentioned sense an intermittent weighing is to be compared, said intermittent weighing being often repeated, so called pulse weighing.

The invention, however, also refers to an arrangement for weighing a continuous material, comprehensive and existing in band or mat form, under execution of the above mentioned method. Said material, thereby is transported on a transport path or on one or several short conveyors, fully or in part replacing said transport path or forming a complement thereof. Under the transport path or the conveyors, respectively, thereby a short conveyor is arranged in connection with a weight recording means, said short conveyor receiving the weight of the path along with the weight of any band or mat formed material situated thereon.

According to the invention the transport path comprises at least two transport means, active in sequence after each other, between which the weight receiving short conveyor is arranged, and the two first mentioned transport means form an obtuse angle with each other, concave upwardly.

The invention will below be further described in connection with a form of execution shown in the attached drawing, but it is understood that the invention shall not be limited to this specific form of execution, but that all different kinds of modifications may occur within the frame of the invention.

In the drawing,

FIG. 1 shows a schematical sketch of the parts contained in the arrangement according to said form of execution, and FIG. 2 shows a diagram for further explanation of the empirically observed function of an arrangement according to the invention.

In a way, which does not form any part of the present invention, and which will therefore not require any further description, mineral wool has been produced in a spinning aggregate situated at the right of the part proper of FIG. 1, and has been deposited upon a collection band 10, which is driven with an adapted speed over a couple of rollers 11 and 12, of which either both are driven by motors or only the one, for instance the roller 12 is driven by a motor. The motor 13, thus, over a transmission of any suitable type 14 drives this roller as well as other rollers in the arrangement. The transmission is indicated by a dash dot line and provided with some branches.

The weighing device proper in this form of execution of the invention comprises two band conveyors 15, 16. These conveyors need not necessarily comprise band conveyors, but also other types of transportation means such as roll conveyors and so on may be used. Between them a shorter conveyor is applied in the form of a roller 17. At the place of the roller 17, however, an inclination upwardly of the transport direction takes place, whereby the transport means 16 is inclined to the horizontal level, whereas, on the contrary, the conveyor 15 is still in the horizontal level. The inclination angle, as mentioned above, is obtuse and directed with its concave side upwardly. Tests which have been made have proved that the inclination angle should preferably be in the order of magnitude of about 150°, but at different times, especially dependent upon the character of the mineral wool path, its thickness and material but also to some degree dependent upon the length of the transport means 15 and 16, the material, weight and tension, it should be possible to readjust it within a range from 135° to 170°.

The roller 17 thus is arranged in the small space between the leaving roller in the transportation means 15 and the receiving roller in the transportation means 16. The roller 17 is movable in a direction perpendicular to the main direction of the transportation means against the action of means, creating a counter force, for instance a weight load, a resilient arrangement or the like, and its movement is registratable in a load sensing means 19, which is arranged in a mechanical or electrical or a corresponding way over transfer conduit 20, indicated by dotted lines, to transfer said indication in the load sensing means 19 to the speed controller 21, which in turn over the conduit 22 influences the speed of the motor 13. In this way all of the series of transportation means or conveyors 10, 15, 16 will be controlled as to their speed a way that one will obtain a very closely constant surface weight of the mineral wool 18 carried up by said conveyor means.

The angle between the two conveyor means 15 and 16 should be adjustable. One way of causing this is to make the conveyor means 16 so that its inclination can be adjusted. The adjustment in this specific case takes place by turning the construction 23 carrying up the conveyor means 16 about the centre of the receiving roller 24 of the band, contained in said conveyor means, which takes place by means of for instance a pneumatic servo motor 25, which on its one side is guidably attached to the floor 26 and on its other side is guidably connected to the carrier construction 23. The feeder conduits for providing a readjustment have not been shown in the drawing, as they are well known to any man skilled in the art.

It is without importance to this invention, how the mineral wool mat is carried on, after it has left the conveyor means 16. This may for instance take place by means of further conveyor means, not specifically indicated in the drawings, in the form of further band conveyors, which of course thereby must be adjustable to adapt the upper end of the conveyor means 16. One may also use a sliding table or the like.

The weight of the mineral wool is rather small, and the variations existing in said weight consequently also will be rather small, but if they constitute too great a variation in relation to the surface weight proper of the mineral wool, a compensation should take place. In order that these variations of weight shall cause the greatest possible reaction in the conduit 20, it is therefore important that the weight of the means, put in an upward or downward movement by the weight of the mineral wool mat, in the present case thus the roller 17 and the means connected thereto, shall be as small as possible. This roller 17 therefore should be small in itself, but it should also be made from a light material and provided with recesses for decreasing its weight. The magnitude of the roller 17 also will determine the distance between the leaving roller of the conveyor 15 and the receiving roller of the conveyor 16.

Suitably, the roller 17 may be arranged at the one end of a lever, which is turnable about a horizontal axis, and which at its other end is provided with a counter weight. The advantage of such an arrangement is that the roller will execute an action as if it would be very light, but a disadvantage may be that its total mass by this arrangement will be greater so that it will react to a smaller degree to quickly repeated variations in the weight of the mineral wool mat. This disadvantage however must be regarded to be of subordinated importance because such quickly repeated variations are only very seldom occuring, and if they occur they will nevertheless to a certain degree be equalized by the subsequent, usually occuring smoothing out of the upper side of the mineral wool, and also because it is in practice difficult to cause the motor 13 and all of the existing conveyor means 10, 15 and 16 quickly to follow indications for compensation of such quick variations in the surface weight of the mineral wool mat.

Tests, which have been made, thus have provided that the weight of the roller 17 along with the movable parts connected therewith should not exceed double the value of the weight influence from the mineral wool path to be registered by the load receiving means 19.

FIG. 2 graphically shows the relation between the surface weight of the mineral wool mat, plotted along the horizontal axis, and the indication of the load sensing means 19, plotted along the vertical axis. The curve a has been obtained at a time, when the two conveyor means 15, 16 were horizontally adjusted in prolongation of each other, and this curve would therefore also indicate, what can be expected to take place when using a traditional, horizontal band weighing arrangement. Thereby, however, it should be especially be mentioned that one will not at all, dependent upon the thickness of the mineral wool 18 and other circumstances, obtain a curve a which is in fixed position in the diagram, but the curve shown in the diagram only reproduces the general character of a plurality of curves, measured under different working circumstances. The curve b on the contrary shows a curve for a loading case, in which one used the arrangement according to the present invention. Under other loading cases, of course, the curve b may assume a somewhat deviating slope.

For providing how close to linear the curve b is, a dotted curve c has also been drawn in the diagram representing the exactly straight line through the point of origin of coordinates.

I claim:
1. A method for continuous weighing and surface weight control of a comprehensive material in continuous travelling band or mat form, comprising supporting and transporting the material along a first driven conveyor and onto a second driven conveyor spaced a short distance from the discharge end of the first conveyor, the first and second conveyors being oriented to form an upwardly concave obtuse angle such that the band of material deforms and bends through an upwardly concave obtuse angle as it passes from the first conveyor to the second conveyor, continuously weighing the band of material as it passes between said first and second conveyors by passing the deformed and bent band onto and along a third non-driven idler conveyor means located between said first and second conveyors and arranged to continuously sense the weight of the band passing therealong, and varying the speed of said first and second conveyors in response to weight changes sensed by said third conveyor means, but maintaining the speeds of said first and second conveyors equal.

2. A method according to claim 1 wherein said idler conveyor is an idler roller mounted for movement normal to said band in response to weight changes of the band passing thereover.

3. A method as claimed in claim 1 wherein said material is mineral wool.

4. A method as claimed in claim 1 in which the angle between said first and second conveyors is between 135° and 170°.

5. A method as claimed in claim 4 in which the angle between said first and second conveyors is substantially 150°.

6. Apparatus for weighing and controlling the surface weight of a comprehensive material in continuous travelling band or mat form, comprising first and second conveyors arranged such that the discharge end of the first conveyor is spaced a short distance from the receiving end of the second conveyor whereby a band of material will travel along the first conveyor and onto the second conveyor, the first and second conveyors being oriented to form an upwardly concave obtuse angle such that a band of material will deform and bend through an upwardly concave obtuse angle as it passes from the first conveyor to the second conveyor, drive means for driving said first and second conveyors at equal speeds, a third non-driven idler conveyor means located between said first and second conveyors such that a deformed and bent band passing from said first conveyor to said second conveyor will pass onto and along said idler conveyor, and means for continuously sensing the weight of a band passing along said idler conveyor means and varying the speed of said drive means in response to variations in said sensed weight.

7. Apparatus as claimed in claim 6 wherein the angle between said first and second conveyors is adjustable.

8. Apparatus as claimed in claim 6 wherein the angle between said first and second conveyors has a value between 135° and 170°.

9. Apparatus as claimed in claim 6 wherein the angle between said first and second conveyors is substantially 150°.

10. Apparatus as claimed in claim 6 wherein said first conveyor is substantially horizontal, and said second conveyor is upwardly inclined.

11. Apparatus as claimed in claim 6 wherein said idler conveyor is an idler roller mounted for movement normal to said band in response to weight changes of the band passing thereover.

12. Apparatus as claimed in claim 6 wherein the first and second conveyors comprise band conveyors.

13. Apparatus as claimed in claim 12 in which said idler conveyor is an idler roller mounted in the space between said first and second conveyors.

* * * * *